US012768390B2

(12) United States Patent
Li et al.

(10) Patent No.: US 12,768,390 B2
(45) Date of Patent: Oct. 20, 2026

(54) FASTENER AND TOILET SEAT WITH THE SAME

(71) Applicant: Globe Union Industrial Corp., Taichung City (TW)

(72) Inventors: Chun-Hung Li, Taichung City (TW); Chun-Yi Tu, Taichung City (TW); Jiun-Li Tsai, Taichung City (TW); Chu-Cheng Chu, Taichung City (TW)

(73) Assignee: GLOBE UNION INDUSTRIAL CORP., Taichung City (TW)

( * ) Notice: Subject to any disclaimer, the term of this patent is extended or adjusted under 35 U.S.C. 154(b) by 76 days.

(21) Appl. No.: 19/018,770

(22) Filed: Jan. 13, 2025

(65) Prior Publication Data

US 2025/0237256 A1 Jul. 24, 2025

(30) Foreign Application Priority Data

Jan. 24, 2024 (TW) ................................ 113200857

(51) Int. Cl.
*F16B 29/00* (2006.01)
*A47K 13/26* (2006.01)

(52) U.S. Cl.
CPC .............. *F16B 29/00* (2013.01); *A47K 13/26* (2013.01)

(58) Field of Classification Search
CPC ................................ F16B 29/00; A47K 13/26
See application file for complete search history.

(56) References Cited

U.S. PATENT DOCUMENTS

| | | | | |
|---|---|---|---|---|
| 3,551,922 | A * | 1/1971 | Watson | A47K 13/26 4/240 |
| 4,319,365 | A * | 3/1982 | Bemis | A47K 13/26 4/240 |
| 9,562,555 | B1 * | 2/2017 | Talbot | F16B 5/0056 |
| 10,285,546 | B2 * | 5/2019 | Edwards | A47K 13/26 |
| 10,724,548 | B2 * | 7/2020 | Huang | F04D 1/02 |
| 2008/0172780 | A1 * | 7/2008 | Shiau | A47K 13/24 4/236 |
| 2008/0212293 | A1 * | 9/2008 | Li | H05K 7/142 361/748 |

(Continued)

FOREIGN PATENT DOCUMENTS

| | | | | |
|---|---|---|---|---|
| CA | 2582750 A1 * | 7/2008 | | A47K 13/24 |
| CN | 101513334 A * | 8/2009 | | F16B 37/08 |

(Continued)

*Primary Examiner* — Lori L Baker
(74) *Attorney, Agent, or Firm* — LANWAY IPR SERVICES; Chun-Ming Shih

(57) ABSTRACT

A fastener includes a base, two upper holding boards on the base, two stopping levers inserted through the upper holding boards, two elastic expansion parts mounted to the stopping levers, two thread engaging members threaded to the stopping levers, and at least one stopping plate pivotally connected to the stopping lever and rotated between a loose position and a tight position. A toilet seat includes the fastener, a seat pivotally connected to the base, and a lid. When the stopping plate is at the loose position, the thread engaging member, the elastic expansion part, and the stopping lever are allowed to insert through an installation hole of a toilet base. While at the tight position, the stopping lever with the thread engaging member are driven to squeeze the elastic expansion part toward the upper holding board.

26 Claims, 7 Drawing Sheets

(56) References Cited

U.S. PATENT DOCUMENTS

| | | | | |
|---|---|---|---|---|
| 2009/0211005 | A1* | 8/2009 | Hand | A47K 13/12 4/240 |
| 2012/0110723 | A1* | 5/2012 | Shih | A47K 13/26 4/240 |
| 2012/0223202 | A1* | 9/2012 | Chen | G06F 1/187 248/309.1 |
| 2012/0240318 | A1* | 9/2012 | Sims | A47K 13/26 4/236 |
| 2013/0148274 | A1* | 6/2013 | Gao | G06F 1/1656 361/679.01 |
| 2014/0078665 | A1* | 3/2014 | Yu | G11B 33/124 361/679.33 |
| 2015/0216380 | A1* | 8/2015 | Timothy | A47K 13/26 4/240 |
| 2015/0327738 | A1* | 11/2015 | Hand | A47K 13/26 4/240 |
| 2015/0368891 | A1* | 12/2015 | Miller | E03D 11/16 4/252.1 |
| 2018/0187411 | A1* | 7/2018 | Shang | F16B 37/045 |
| 2018/0228325 | A1* | 8/2018 | Edwards | A47K 13/26 |
| 2020/0003229 | A1* | 1/2020 | Huang | F04D 11/00 |
| 2021/0062487 | A1* | 3/2021 | Halloran | E03D 1/34 |
| 2025/0025002 | A1* | 1/2025 | Ward, II | A47K 13/26 |
| 2025/0320711 | A1* | 10/2025 | Chang | E03D 11/16 |
| 2026/0047730 | A1* | 2/2026 | Weiss | A47K 13/26 |

FOREIGN PATENT DOCUMENTS

| | | | | | |
|---|---|---|---|---|---|
| CN | 112443016 | A | * | 3/2021 | E03D 1/00 |
| CN | 111201380 | B | | 6/2022 | |
| CN | 222375581 | U | * | 1/2025 | E03D 11/16 |
| DE | 102008053566 | A1 | * | 6/2009 | A61B 17/175 |
| EP | 1213427 | A2 | * | 6/2002 | F16B 13/00 |
| FR | 3039977 | A3 | * | 2/2017 | A47K 13/26 |
| GB | 2447861 | A | * | 10/2008 | F16B 35/06 |
| JP | 2553149 | Y2 | * | 11/1997 | F16B 37/08 |
| JP | H10243894 | A | * | 9/1998 | A47K 13/26 |
| JP | 3059663 | B2 | * | 7/2000 | F16B 37/08 |
| JP | 2007160124 | A | * | 6/2007 | F16B 37/08 |
| JP | 2007278465 | A | * | 10/2007 | F16B 37/08 |
| JP | 2012147991 | A | * | 8/2012 | F16B 37/08 |
| NO | 180092 | B | * | 11/1996 | F16B 37/08 |
| WO | WO-2012083096 | A1 | * | 6/2012 | A47K 13/26 |
| WO | WO-2012125535 | A2 | * | 9/2012 | F16B 31/021 |
| WO | WO-2014109721 | A1 | * | 7/2014 | F16B 13/0808 |

* cited by examiner

FASTENER AND TOILET SEAT WITH THE SAME

FIELD OF THE INVENTION

The present invention relates to a toilet installation part, especially to a fastener able to install and fix a toilet seat on a toilet base and the toilet seat with the fastener.

BACKGROUND OF THE INVENTION

Generally, a toilet base is equipped with a toilet seat which is composed of an open seat and a lid, both pivotally connected to a base. The base is usually fastened by two bolts inserted through installation holes located at right and left sides on a top of a rear part of a toilet base and threaded by nuts correspondingly. Thus the toilet seat is installed and fixed on the toilet base.

However, a bottom of the rear part of the toilet base is usually close to a wall behind so that threading of the nut to the bolt in a narrow space is not easy for installers and special tools are required. Moreover, the bolt and the nut are maintained at the fastened state for a long period after installation, without being detached. Then the nut is difficult to be rotated and loosened from the bolt because it's not maintained in a clean condition or rusted. The following re-installation is also getting hard.

Furthermore, under certain conditions, the nut is loosened due to operation and use of the toilet seat and thus the normal use of the toilet seat is affected. The nut needs to be rotated and tightened again after a period of time.

In addition, the toilet base is often made of ceramic materials. A shrinkage rate of the ceramic materials is difficult to be controlled during formation process. Thus positions of the installation holes on the rear part of the toilet base produced each time often have greater differences, especially a distance between the two installation holes. This may cause the bolt unable to be inserted through the installation hole smoothly, difficulty in assembly, certain effects on assembly stability and quality, or loss in service life of assembled components.

In order to solve the above problems, an engagement apparatus is provided in Chinese Pat. No. CN111201380 B. The engagement apparatus has a plurality of embodiments. In one of the embodiments, an engagement apparatus in the form of a retaining pin can connect a seat and a lid to a toilet base. The engagement apparatus includes a pin inserted through a body section and an expandable section in turn and threaded to a second section as a nut. The body section is threaded with a first section and able to be threaded and fastened to a housing of a toilet seat. Thus the body section is like the base mentioned above. A lever is pivotally mounted to a top of the pin. By the lever being pulled and operated on the housing of the toilet seat, the pin is driven to move upward and downward axially. Thus the expandable section is squeezed by the first section and the second section axially to have elastic expansions and deformation. Thereby the second section, the expandable section, the first section, and a part of the pin can be abutted against and pressed tightly on the bottom of a hole of the toilet base while being inserted through the hole due to elastic expansions and deformation of the expandable section. Thus installers can easily pull and operate the lever from a top of the toilet base for mounting the seat and the lid to the toilet base. Similarly, by pulling and operating the lever from the top of the toilet base, the pin and the second section on the pin can also be driven to move downward axially. Thus the expandable section is elastically compressed or at least a part of the expandable section is returned to its original state. The seat and the lid are further detached and separated from the toilet base easily. The installer doesn't need to tighten or loosen the engagement apparatus in a narrow space under the toilet base. The problems occurred during fastening of the conventional toilet seat can be solved.

However, the above design still has certain shortcomings. For example, the engagement apparatus includes two pins used in combination with the lever, the body section, the first section, the expandable section, and the second section independent from one another. During installation of the seat and the lid, the installer needs to operate the lever separately, unable to install at one time.

Moreover, the above engagement apparatus has more components and the assembly is more complicated. Thus the installers may have faulty assembly.

Although the above body section can be directly fastened on the housing of the toilet seat, the two independent body sections on the left side and the right side need to be at the same level during threading and fastening and this causes trouble in assembly. The body section is unable to be adjusted horizontally by such assembly way. For example, the engagement apparatus can still be pressed tightly on the bottom of a hole of the toilet base by the expandable section when a distance between the left and the right holes of the toilet base is larger. A distance between the two independent body sections on the left side and the right side of the toilet base is unable to be adjusted slightly so that a distance between the top of the two pins is narrower while a distance between the bottom of the two pins is wider. Thereby the pin may be tilted. The expandable section of the engagement apparatus is unable to be pressed tightly on the bottom of the respective holes in the best condition once the pin is not in a vertical state. The assembly stability and fastening durability are further reduced. The pin may even have bending and deformation which further decrease the assembly stability and fastening durability.

The lever is not provided with drainage design, especially at the fastened state. With a smooth and flat upper surface, water is easy to accumulate on the upper surface of the lever and thus clean and sanitary use of the lever is affected.

The above first section is threaded to and positioned at the body section and able to be mounted into the hole of the toilet base from top to bottom. The diameter of the hole may have larger size error due to difficulty in control of shrinkage rate of the ceramic materials. In order to ensure that the first section can be mounted into the hole smoothly, the first section is a round tube with a fixed diameter which is usually designed to be obviously smaller than the diameter of the hole. Such design leads to a larger gap between the first section and an inner surface of the hole. Thereby a larger lateral movement and shaking may occur after installation of the seat and the lid and users may feel uncomfortable while in use.

SUMMARY

Therefore, it is a primary object of the present invention to provide a fastener and a toilet seat with the same. By the fastener, the toilet seat can be firmly installed and fixed on a toilet base easily and fast. A detachment process of the toilet seat is also simple and quick.

In order to achieve the above object, a fastener according to the present invention includes a base, two upper holding boards, two stopping levers, two elastic expansion parts, two thread engaging members, and a stopping plate. The base consists of an upper surface, a lower surface, and a positioning slot which is arranged concavely on each of two sides of the lower surface. Each of the upper holding boards is provided with a positioning plate horizontally mounted and positioned in the positioning slot, a clamping projection extending and projecting from a lower surface of the positioning plate, and an insertion hole penetrating the positioning plate and the clamping projection. Each of the stopping levers is inserted through the insertion hole of the upper holding board and provided with a first end, a second end, and a threaded portion located at the second end. The elastic expansion parts are mounted to the stopping levers correspondingly and able to be squeezed axially to have elastic expansion. Each of the thread engaging members is connected to the threaded portion of the stopping lever by thread engagement so that the elastic expansion part is clamped and abutted against the clamping projection of the upper holding board. The stopping plate is able to be operated and rotated between a loose position and a tight position. The stopping plate is composed of two pivot slots corresponding to the positioning slots, a first pressing portion, and a second pressing portion. The first end of the stopping lever is pivotally connected to the pivot slot. When the stopping plate is rotated and positioned at the loose position, the first pressing portion is abutting against the upper surface of the base so that the stopping lever is moved for driving the thread engaging member to move downward axially. Thus the elastic expansion part is loosened and released. When the stopping plate is rotated and positioned at the tight position, the second pressing portion is abutting against the upper surface of the base so that the stopping lever is moved to drive the thread engaging member to move upward axially. Thus the elastic expansion part is squeezed and expanded.

The fastener further includes two rotary shafts. Each of two sides of the stopping plate is provided with a lateral insertion hole communicating with the pivot slot. The rotary shaft is inserted through the lateral insertion hole for pivotally connecting the first end of the stopping lever to the pivot slot.

The fastener further includes two sealing plugs each of which is used for sealing the lateral insertion hole.

A first radial distance is formed between the first pressing portion and an axis of the corresponding rotary shaft of the fastener. A second radial distance is formed between the second pressing portion and the axis of the corresponding rotary shaft of the fastener. The second radial distance is larger than the first radial distance.

A press surface is disposed on one side of the stopping plate opposite to a side of the stopping plate with the second pressing portion for allowing users to press and operate. Thus the stopping plate is rotated and moved from the loose position to the tight position.

The stopping plate includes a first side and a second side opposite to each other. The pivot slot is corresponding to the first side. A lip-shaped pull portion is projecting and extending from the second side so that users can pull and apply force to the pull portion for rotating the stopping plate from the tight position to the loose position.

An upper surface of the pull portion of the fastener is smoothly extending from the press surface.

The press surface and the upper surface of the pull portion of the fastener are tilted and combined to form a draining surface when the stopping plate is at the tight position.

The clamping projection of the upper holding board of the fastener is tapered from a junction between the clamping projection and the positioning plate toward an end of the clamping projection to form a conical cylinder.

The fastener further includes two anti-slip washers. Two installation slots are disposed on the lower surface of the base and located around the positioning slot for mounting and positioning the anti-slip washers correspondingly. A bottom of the anti-slip washer is provided with an anti-slipping surface which is a little bit projecting from the lower surface of the base. The anti-slip washer is further provided with an opening for allowing the clamping projection of the upper holding board to insert through.

An omnidirectional horizontal movement gap is formed between the positioning plate of the upper holding board and the positioning slot of the base of the fastener.

A sliding gap is formed between the stopping lever and the pivot slot of the stopping plate of the fastener for allowing fine adjustment and sliding of the stopping lever on the corresponding rotary shaft.

A fastener according to the present invention includes a base, two upper holding boards, two stopping levers, two elastic expansion parts, two thread engaging members, and two stopping plates. The base consists of an upper surface, a lower surface, and a positioning slot which is arranged concavely on each of two sides of the lower surface. Each of the upper holding boards is provided with a positioning plate horizontally mounted and positioned in the positioning slot, a clamping projection extending and projecting from a lower surface of the positioning plate, and an insertion hole penetrating the positioning plate and the clamping projection. Each of the stopping levers is inserted through the insertion hole of the upper holding board and composed of a first end, a second end, and a threaded portion located at the second end. The elastic expansion parts are mounted to the stopping levers correspondingly and able to be squeezed axially to have elastic expansion. Each of the thread engaging members is connected with the threaded portion of the stopping lever by thread engagement so that the elastic expansion part is clamped and abutted against the clamping projection of the upper holding board. Each of the stopping plates is able to be pulled and rotated between a loose position and a tight position and is composed of a pivot slot corresponding to the positioning slot, a first pressing portion, and a second pressing portion. The first end of the stopping lever is pivotally connected to the corresponding pivot slot. When one of the stopping plates is rotated and positioned at the loose position, the first pressing portion of the stopping plate is abutting against an upper surface of the base so that the corresponding stopping lever is moved to drive the corresponding thread engaging member to move downward axially. Thus the corresponding elastic expansion part is loosened and released. When one of the stopping plates is rotated and positioned at the tight position, the second pressing portion of the stopping plate is abutting against the upper surface of the base so that the corresponding stopping lever is moved to drive the corresponding thread engaging member to move upward axially. Thus the corresponding elastic expansion part is squeezed and expanded.

The fastener further includes two rotary shafts. At least one of two sides of the stopping plate is provided with a lateral insertion hole communicating with the pivot slot for allowing the rotary shaft to insert in. Thereby the first end of the stopping lever is pivotally connected to the pivot slot by the rotary shaft.

The fastener further includes two sealing plugs each of which is used for sealing the lateral insertion hole.

A first radial distance is formed between the first pressing portion and an axis of the corresponding rotary shaft of the fastener. A second radial distance is formed between the second pressing portion and the axis of the corresponding rotary shaft of the fastener. The second radial distance is larger than the first radial distance.

A press surface is disposed on one side of the stopping plate opposite to a side of the stopping plate with the second pressing portion for allowing users to press and operate. Thus the stopping plate is rotated and moved from the loose position to the tight position.

Each of the stopping plates is provided with a first side and a second side opposite to each other. The pivot slot is corresponding to the first side. A lip-shaped pull portion is projecting and extending from the second side so that users can pull and apply force to the pull portion for rotating the stopping plate from the tight position to the loose position.

An upper surface of the pull portion of the fastener is smoothly extending from the press surface.

The press surface and the upper surface of the pull portion of the fastener are tilted and combined to form a draining surface when the stopping plate is at the tight position.

The clamping projection of the upper holding board of the fastener is tapered from a junction between the clamping projection and the positioning plate toward an end of the clamping projection to form a conical cylinder.

The fastener further includes two anti-slip washers. Two installation slots are disposed on the lower surface of the base and located around the positioning slot for mounting and positioning the anti-slip washers correspondingly. A bottom of the anti-slip washer is provided with an anti-slipping surface which is a little bit projecting from the lower surface of the base. The anti-slip washer is further provided with an opening for allowing the clamping projection of the upper holding board to insert through.

An omnidirectional horizontal movement gap is formed between the positioning plate of the upper holding board and the positioning slot of the base of the fastener.

A sliding gap is formed between the stopping lever and the pivot slot of the stopping plate of the fastener for allowing fine adjustment and sliding of the stopping lever on the corresponding rotary shaft.

A toilet seat is provided. The toilet seat is installed on a toilet base and is composed of the fastener, an open seat, and a lid. An installation wall is arranged at a top of a rear part of the toilet base and provided with two installation holes. The lower surface of the base of the fastener can be attached to and pressing against an upper surface of the installation wall of the toilet base. The clamping projection of the upper holding board is moved downward to be mounted and positioned in the corresponding installation hole. When the stopping plate is at the tight position, at least a part of the elastic expansion parts is moved upward to be mounted and clamped in the corresponding installation hole for creating clamping and fastening effect. When the stopping plate is at the loose position, the elastic expansion part is moved downward or released from the corresponding installation hole. Thus at least a part of the elastic expansion part is returned to original state elastically for allowing the elastic expansion part to move upward and insert through the corresponding installation hole. A pivot joint seat is projecting from the upper surface of the base and located adjacent to the stopping plate for pivot connection and positioning of the open seat and the lid.

By the design of the single stopping plate in the first fastener, loosening or fastening of the two fastening members at the left side and the right side can be finished at the same time during one operation. Thus the assembly or dis assembly process can be simplified and detachment efficiency is increased.

With fewer components, the present fastener can be assembled easily and fast. Incorrect assembly by staff can also be avoided.

Compared with conventional threaded engagement structure, the design of the positioning plate of the upper holding boards horizontally mounted and positioned in the positioning slot of the base not only provides easier and faster assembly but also ensures the upper holding boards of the fastening members at the left side and the right side both at the same level, especially the clamping projection of the upper holding board which affects consistency of the following elastic expansion or compression of the respective elastic expansion parts.

The present invention not only provides a horizontal movement gap designed between the positioning plate of the upper holding board and the positioning slot of the base for allowing automatic fine adjustment of the positioning plate in the positioning slot but also provides a sliding gap formed between the first end of the stopping lever and the pivot slot of the stopping plate for allowing fine adjustment and sliding of the first end of the stopping lever on the corresponding rotary shaft. When there is a larger difference in the distance between the installation holes on the left side and the right side of the toilet base, the whole stopping lever together with the components thereof can keep at the vertical state by the horizontal movement gap combined with the sliding gap. Thus the respective fastening members can provide fastening effect in optimal condition. Therefore, the installation is more stable and the fastening is more durable. Bending deformation of the stopping lever caused by tilting can also be avoided. The service life and functions of the component are ensured.

The stopping plate is provided with the press surface conductive to drainage and the pull portion extending smoothly from the press surface to avoid water accumulated on the surface of the stopping plate. Thereby clean and sanitary use of the stopping plate are ensured, especially when users need to operate the stopping plate later.

The clamping projection of the upper holding board is tapered from a junction between the clamping projection and the positioning plate toward an end of the clamping projection to form a conical cylinder. Such design not only allows the clamping projection able to be mounted to the installation holes easily and quickly. Under installation and fastening condition, the design is also ensured that a gap between the clamping projection and the installation holes will not be too large, or the clamping projection is even locked and positioned in an inner wall of the installation holes no matter a diameter of the installation holes is getting larger or smaller due to shrinkage of ceramic materials after molding. Thereby the installed toilet seat will not have obvious lateral movement or shaking and a sense of discomfort derived during the use can be avoided effectively.

An anti-slip washer is arranged around the respective positioning slots of the lower surface of the base. The anti-slip washer is not only made from anti-slip material such as rubber material able to have larger friction force with respect to ceramic materials but also distributed around the respective fastening members and arranged evenly on the left and the right sides of the base for providing more even and larger contact area on the right and the left sides of the base. After completing installation of the above the above fastener, the anti-slip washer is pressed tightly on the right and the left sides of an upper surface of the installation wall evenly and firmly and further providing good anti-slip and fastening effect. The slip resistance between the toilet seat and the upper surface of the toilet base is further improved and strengthened. The lateral movement or sliding generated and a sense of discomfort derived in use can be avoided effectively.

DETAILED DESCRIPTION

Figure 1:
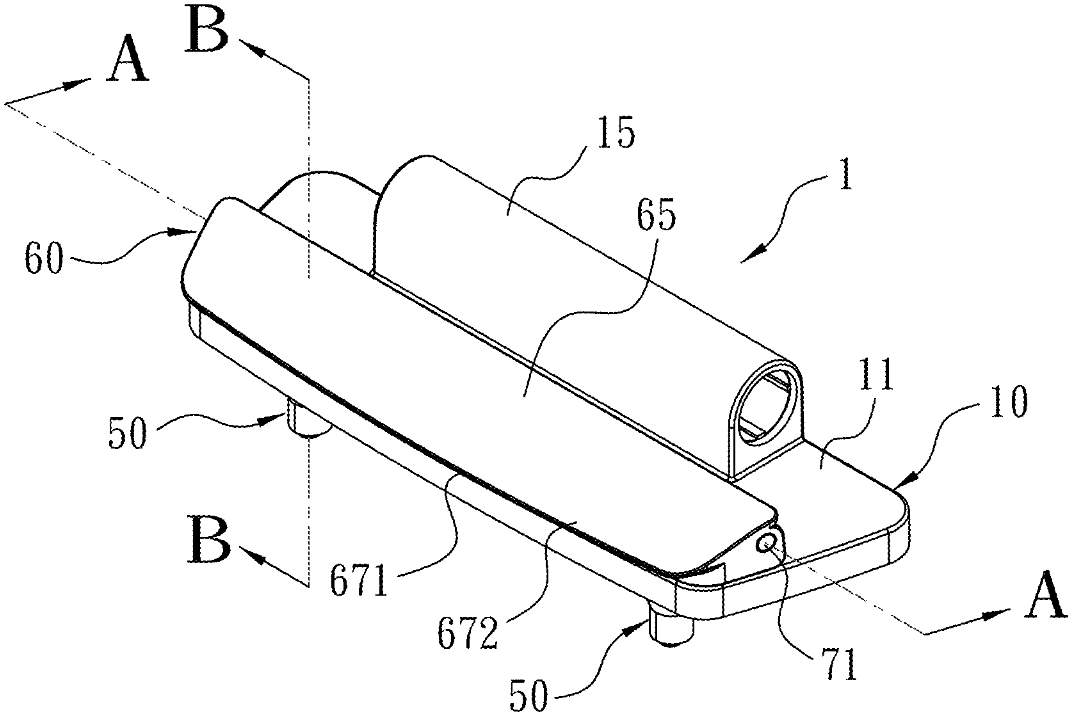
FIG. 1 is a perspective view of an embodiment showing a stopping plate at a tight position according to the present invention.

Refer to FIG. 1-4, a first embodiment of a fastener according to the present invention is provided. The fastener 1 includes a base 10, two upper holding boards 20, two stopping levers 30, two elastic expansion parts 40, two thread engaging members 50, and a stopping plate 60.

Figure 5:
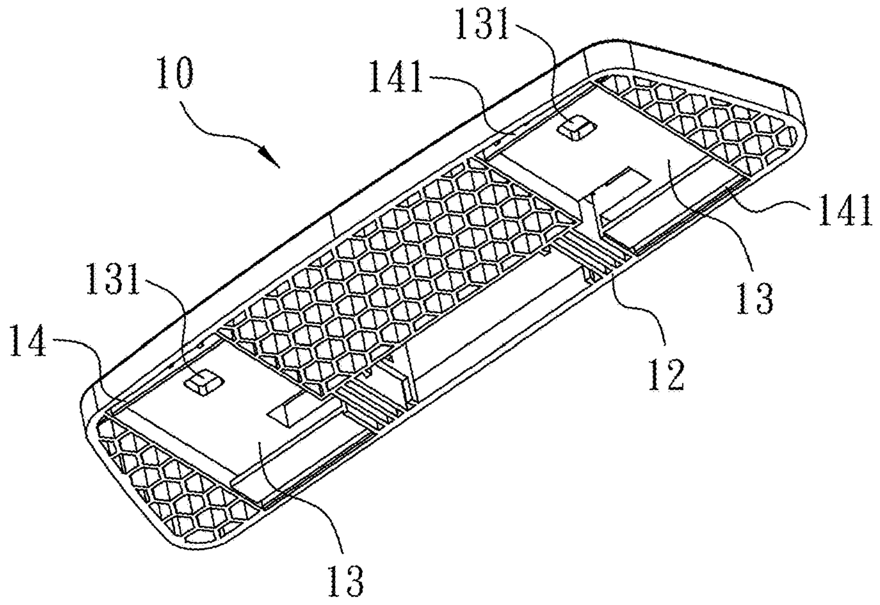
FIG. 5 is a bottom perspective view of a base of an embodiment according to the present invention.

As shown in FIG. 5, the base 10 consists of an upper surface 11, a lower surface 12, and a positioning slot 13 which is arranged concavely on each of two sides of the lower surface 12 and having a shape close to a rectangle. A through hole 131 is formed on a bottom of the positioning slot 13.

Figure 6:
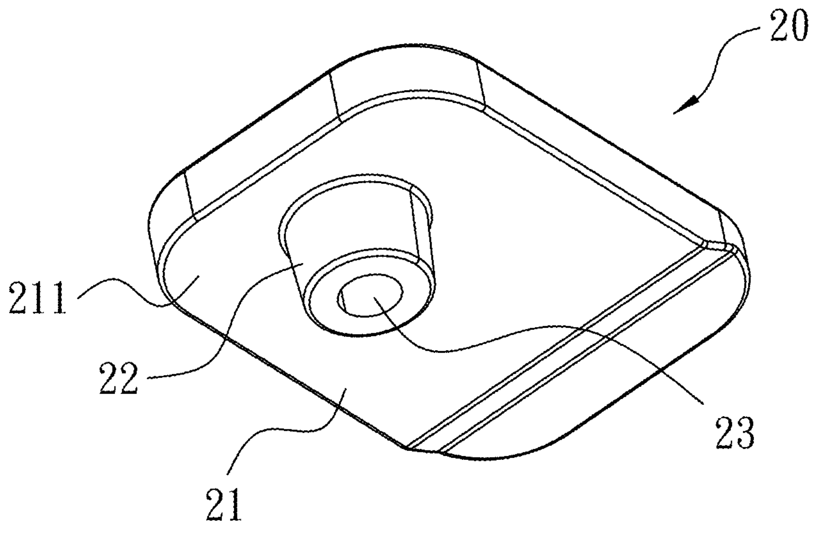
FIG. 6 is a bottom perspective view of an upper holding board of an embodiment according to the present invention.

As shown in FIG. 6, each of the upper holding boards 20 is provided with a positioning plate 21 horizontally mounted and positioned in the positioning slot 13, a clamping projection 22 extending and projecting from a lower surface 211 of the positioning plate 21, and an insertion hole 23 penetrating the positioning plate 21 and the clamping projection 22.

Each of the stopping levers 30 is inserted through the through hole 131 of the base 10 and the insertion hole 23 of the upper holding board 20 and having a first end 31, a second end 32, and a threaded portion 33 located at the second end 32. In this embodiment, the threaded portion 33 is designed to be a segment with external threads.

The elastic expansion parts 40 are inserted by and mounted to the stopping levers 30 correspondingly and able to be squeezed axially to have elastic expansion.

The elastic expansion part 40 is designed to be a cylindrical tube. When an upper end and a lower end of the elastic expansion part 40 are squeezed axially, a middle part of the elastic expansion part 40 is gradually expanded radially to provide impaction and fastening required. It can be easily imagined that the shape is not limited to the cylindrical tube mentioned above, the shape can also be others such as a barrel bulging out in the middle. Basically, the shape of the elastic expansion part 40 meets structural requirements of the present invention as long as the middle part is bulging when the upper and the lower ends are squeezed.

The elastic expansion parts 40 can be made of elastic materials such as common rubber material.

Each of the thread engaging members 50 is connected to the threaded portion 33 of the stopping lever 30 by thread engagement so that the elastic expansion part 40 is clamped and abutted against the clamping projection 22 of the upper holding board 20. In this embodiment, the thread engaging member 50 is a nut in a cylindrical tubular form or other forms.

Figure 7:
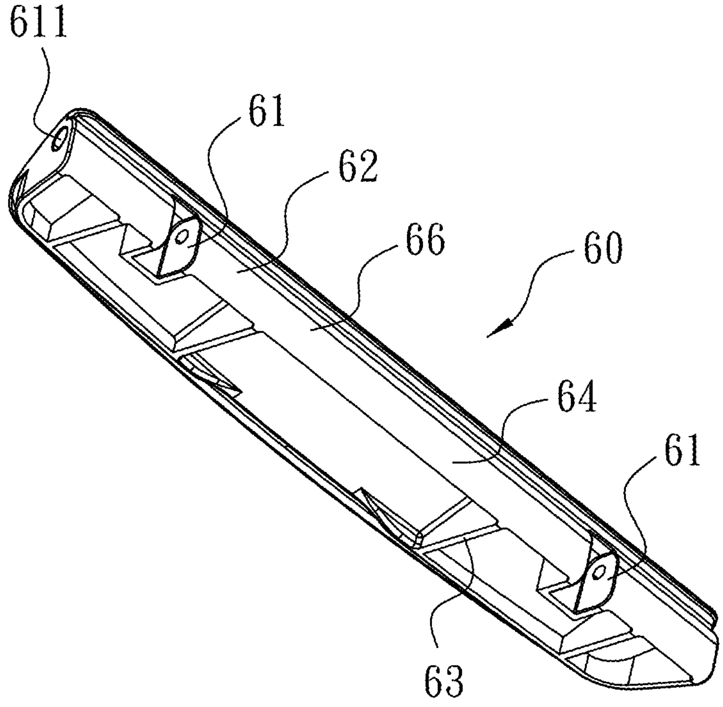
FIG. 7 is a bottom perspective view of a stopping plate of an embodiment according to the present invention.
Figure 8:
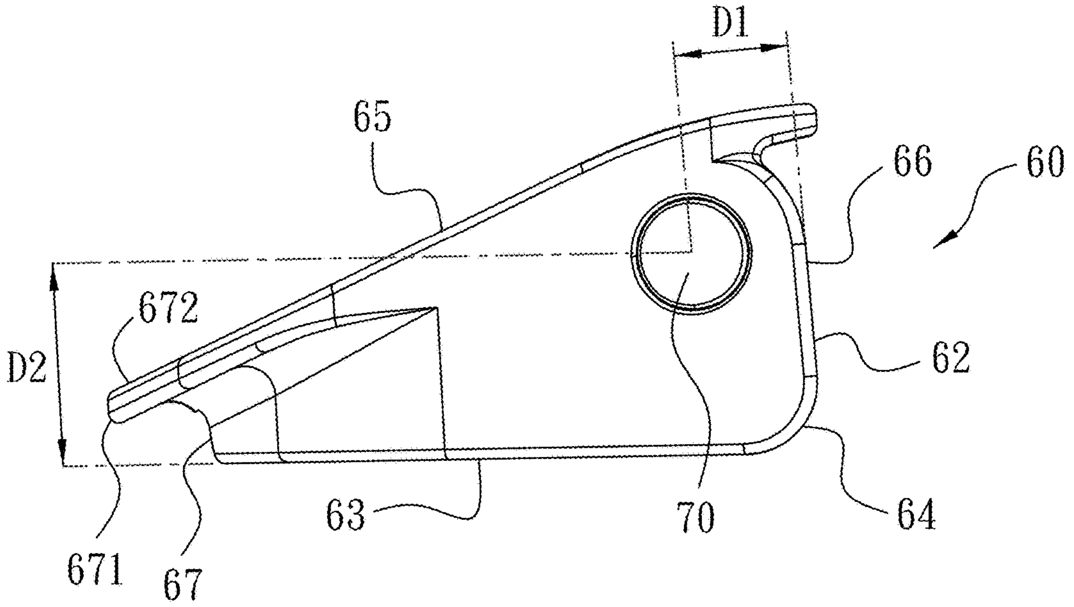
FIG. 8 is a side view showing a right side of a stopping plate of an embodiment according to the present invention.
Figure 10:
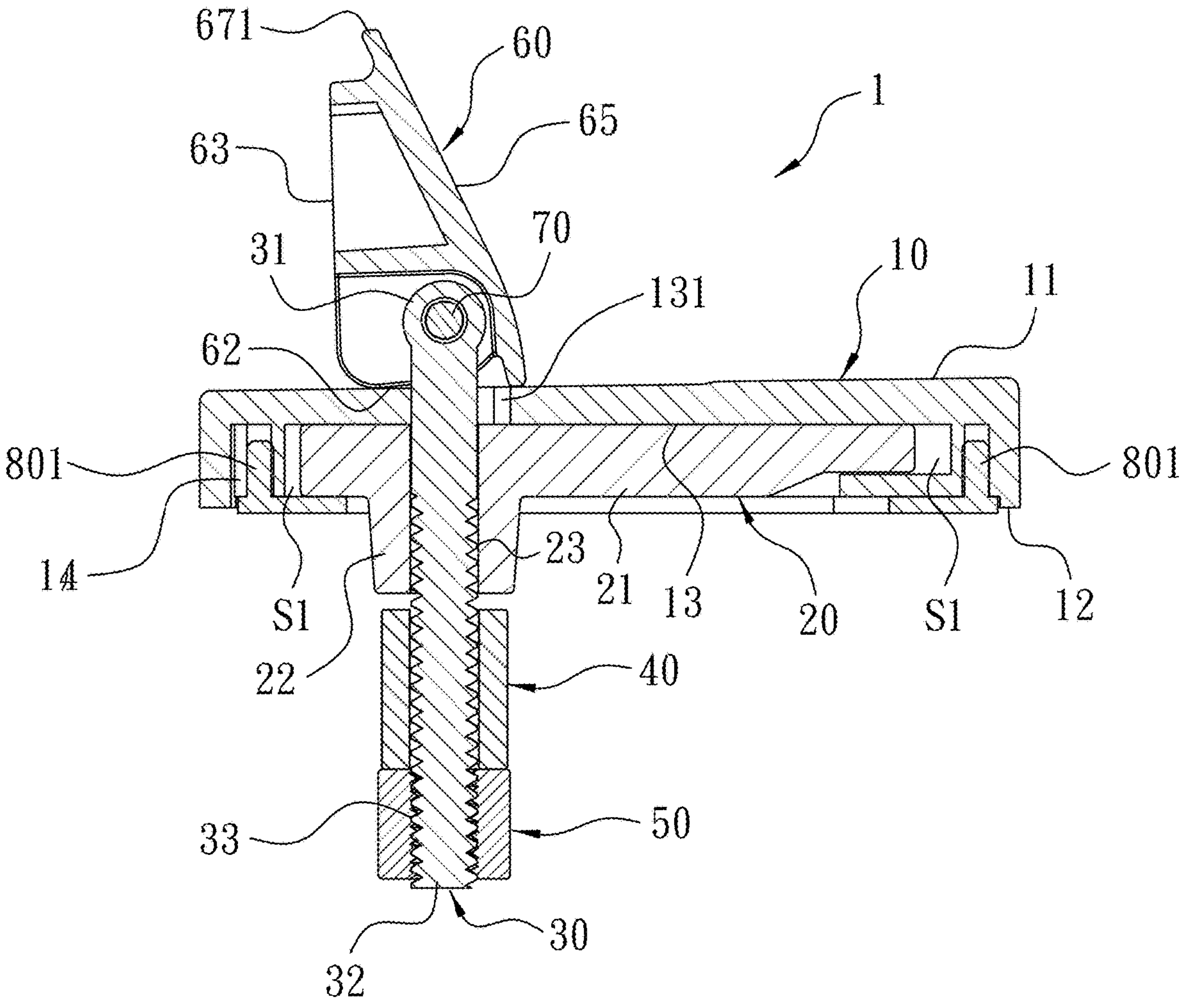
FIG. 10 is a schematic drawing showing a stopping plate of the fastener of the embodiment in FIG. 4 being pulled and rotated to a loose position according to the present invention.

Refer to FIG. 7, FIG. 8, and FIG. 10, the stopping plate 60 can be pulled and rotated between a loose position and a tight position. The stopping plate 60 is composed of two pivot slots 61 corresponding to the positioning slots 13, a first pressing portion 62, and a second pressing portion 63. The first end 31 of the stopping lever 30 is pivotally connected to the pivot slot 61. When the stopping plate 60 is rotated and positioned at the loose position, the first pressing portion 62 is abutting against the upper surface 11 of the base 10 so that the stopping lever 30 is moved to drive the thread engaging member 50 to move downward axially. Thus the elastic expansion part 40 is loosened and released. When the stopping plate 60 is rotated and positioned at the tight position, the second pressing portion 63 is abutting against the upper surface 11 so that the stopping lever 30 is moved to drive the thread engaging member 50 to move upward axially. Thus the elastic expansion part 40 is pressed and expanded.

In this embodiment, the first pressing portion 62 and the second pressing portion 63 mentioned above can be designed to be about a flat surface and its advantage is in that: a more stable pressing effect is obtained while the first pressing portion 62 or the second pressing portion 63 is abutting against the upper surface 11 of the base 10. The design prevents the stopping plate 60 from loosening caused by unintended collision or shaking, especially uncontrollable self-loosening while the stopping plate 60 is rotating from the tight position to the loose position.

In this embodiment, the fastener 1 further includes two rotary shafts 70. Each of two sides of the stopping plate 60 is provided with a lateral insertion hole 611 communicating with the pivot slot 61 for allowing the rotary shaft 70 to insert in. Thus the first end 31 of the stopping lever 30 is pivotally connected to the pivot slot 61 by the rotary shaft 70. In this embodiment, an axial hole 311 is mounted to the first end 31 of the stopping lever 30 and inserted by and combined with the rotary shaft 70 to form a rotation axis around which the stopping plate 60 is rotated between the loose position and the tight position.

In this embodiment, the fastener 1 further includes two sealing plugs 71 each of which is used for sealing the lateral insertion hole 611 to prevent water or other impurities and objects from entering the lateral insertion hole 611. Thus smooth rotation and operation are ensured.

As shown in FIG. 8, in this embodiment, a first radial distance D1 is formed between the first pressing portion 62 and an axis of the corresponding rotary shaft 70. Similarly, a second radial distance D2 is formed between the second pressing portion 63 and the axis of the corresponding rotary shaft 70. The second radial distance D2 is larger than the first radial distance D1. It is easy to understand that by a design of a difference in the radial distances mentioned above, it is ensured that vertical axial movement of the thread engaging member 50 driven by the stopping lever 30 can axially squeeze the elastic expansion part 40 or properly release squeezing force when the stopping plate 60 is switched between the loose position and the tight position.

It is learned that when the stopping plate 60 is operated and rotated from the loose position to the tight position, the stopping plate 60 is gradually changed from the state of the first pressing portion 62 abutting against the upper surface 11 of the base 10 to the state of the second pressing portion 63 abutting against the upper surface 11 of the base 10. On the contrary, when the stopping plate 60 is operated and rotated from the tight position to the loose position, the stopping plate 60 is gradually changed from the state of the second pressing portion 63 abutting against the upper surface 11 of the base 10 to the state of the first pressing portion 62 abutting against the upper surface 11 of the base 10. In order to ensure smooth switching and operation, a curved guiding surface 64 is designed to be located between the first pressing portion 62 and the second pressing portion 63.

The design with an eccentric cam can form structure similar to the above first pressing portion 62, the second pressing portion 63, and the curved guiding surface 64 and provide similar loosening and fastening effects. The difference between the common eccentric cam design and this embodiment is in that the about flat surface of the first pressing portion 62 and the second pressing portion 63 can prevent the stopping plate 60 from uncontrollable loosening compared with the common eccentric cam design.

In this embodiment, a press surface 65 is disposed on one side of the stopping plate 60 opposite to a side of the stopping plate 60 with the second pressing portion 63 for allowing users to press and operate. Thus the stopping plate 60 is rotated from the loose position to the tight position. As shown in figure, it is clear that the press surface 65 is about on an upper side when the stopping plate 60 is at the tight position, as shown in FIG. 4.

Figure 3:
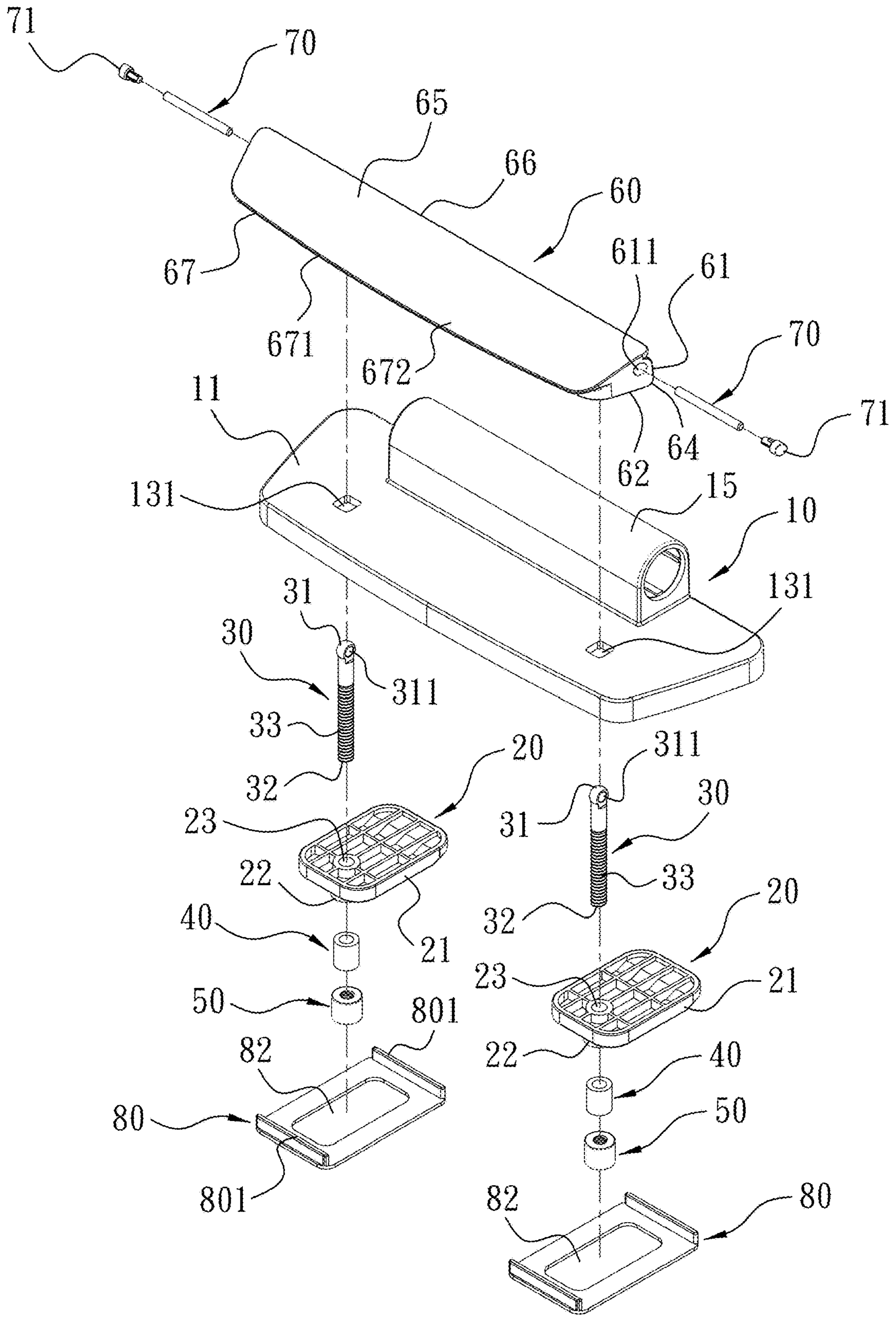
FIG. 3 is an exploded view of an embodiment according to the present invention.
Figure 4:
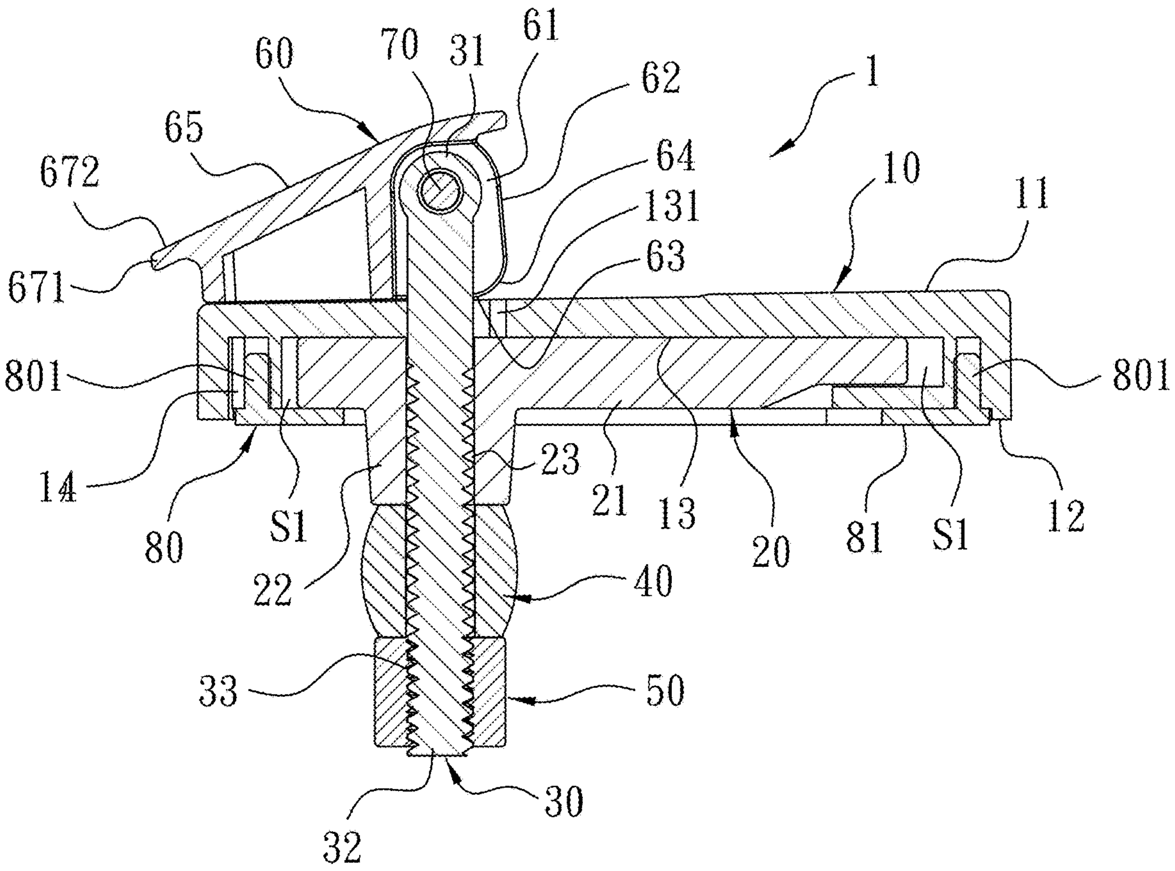
FIG. 4 is a side sectional view along a line B-B of the embodiment in FIG. 1 according to the present invention.

In this embodiment, as shown in FIG. 3 and FIG. 4, the stopping plate 60 has a first side 66 and a second side 67 opposite to each other. The pivot slot 61 is corresponding to the first side 66. A lip-shaped pull portion 671 is projecting and extending from the second side 67 so that users can pull and apply force to the pull portion 671 for rotating and operating the stopping plate 60 from the tight position to the loose position.

In a preferred embodiment, an upper surface 672 of the pull portion 671 is smoothly extending from the press surface 65. When the stopping plate 60 is located at the tight position, the press surface 65 and the upper surface 672 of the pull portion 671 are tilted and combined to form a draining surface which keeps clean water flowing and draining automatically.

In a preferred embodiment, the clamping projection 22 of the upper holding board 20 is tapered from a junction between the clamping projection 22 and the positioning plate 21 toward an end of the clamping projection 22 to form a conical cylinder. By design of the conical cylinder, the clamping projection 22 of the upper holding board 20 can be guided into a hole smoothly such as a hole of a toilet base. A detailed description is provided in the following paragraphs.

As shown in FIG. 3-5, in this embodiment, the fastener 1 further includes two anti-slip washers 80. Two installation slots 14 each of which is composed of two grooves 141 on a front side and a rear side of the base 10 are disposed on the lower surface 12 of the base 10 and located around the positioning slot 13 for mounting and positioning two mounting blocks 801 projecting from a front side and a rear side of the respective anti-slip washers 80 correspondingly. A bottom of the anti-slip washer 80 is provided with an anti-slipping surface 81 which is designed to be a little bit projecting from the lower surface 12 of the base 10. The purpose of such design is to create larger friction force for preventing the base 10 from loosening while the anti-slipping surface 81 is attached to or pressing against a surface. For example, the anti-slipping surface 81 can be attached to or pressing against a surface of a toilet base. The anti-slip washer 80 is further provided with an opening 82 for allowing the clamping projection 22 of the upper holding board 20 to insert through.

Figure 2:
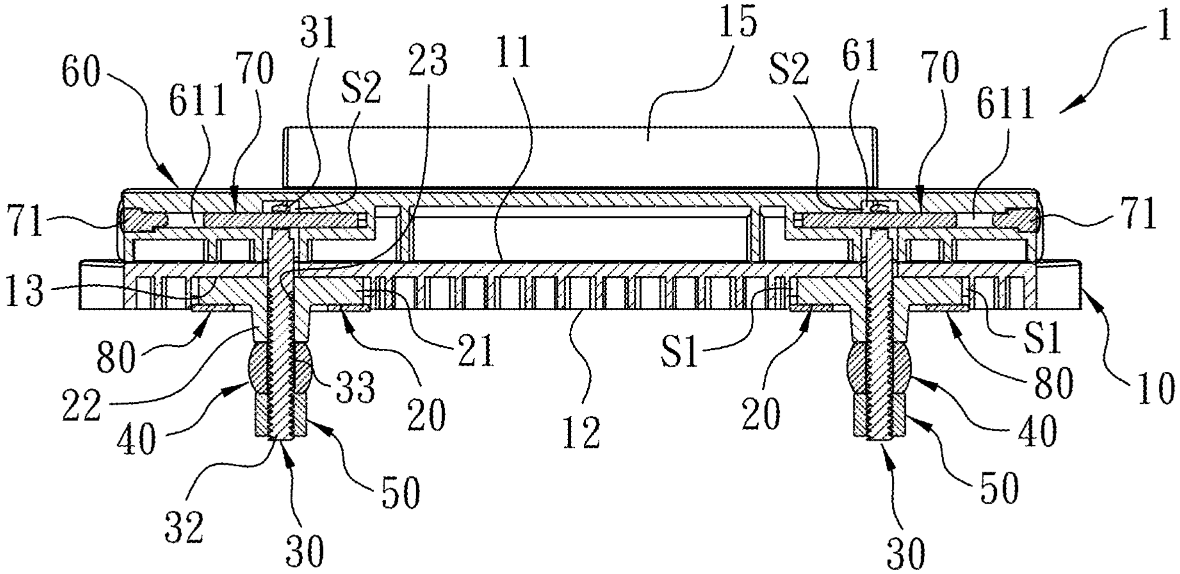
FIG. 2 is a side sectional view along a line A-A of the embodiment in FIG. 1 according to the present invention.

As shown in FIG. 2 and FIG. 4, in this embodiment, an omnidirectional horizontal movement gap S1 is formed between the positioning plate 21 of the upper holding board 20 and the positioning slot 13 of the base 10. By the design of the horizontal movement gap S1, the positioning plate 21 of the upper holding board 20 can be adjusted slightly and moved toward any one of directions a bit, especially horizontal movement between the left and the right directions. Thereby positions of the upper holding boards 20 on the left side and the right side relative to each other, especially a horizontal distance between respective axes can be slightly adjusted and changed in order to adapt to two holes with different distance therebetween such as two holes on a toilet base. The distance between the holes may be unable to be produced accurately due to various factors such as materials or manufacturing processes.

As shown in FIG. 2, in this embodiment, a sliding gap S2 is formed between the stopping lever 30 and the pivot slot 61 of the stopping plate 60 for allowing fine adjustment and sliding of the stopping lever 30 on the corresponding rotary shaft 70. An axial hole 311 is arranged at the first end 31 of the stopping lever 30 for disposed on axially and slidably mounting the corresponding rotary shaft 70. By the design of the sliding gap S2, the first end 31 of the stopping lever 30 is allowed to be adjusted slightly and sliding horizontally between the left and the right sides on the rotary shaft 70. In combination with the horizontal movement gap S1, both the stopping lever 30 and the upper holding board 20 can be adjusted and moved slightly together with each other. Automatic fine-adjustment and correction are provided in response to possible differences in the distance between various types of holes.

Figure 12:
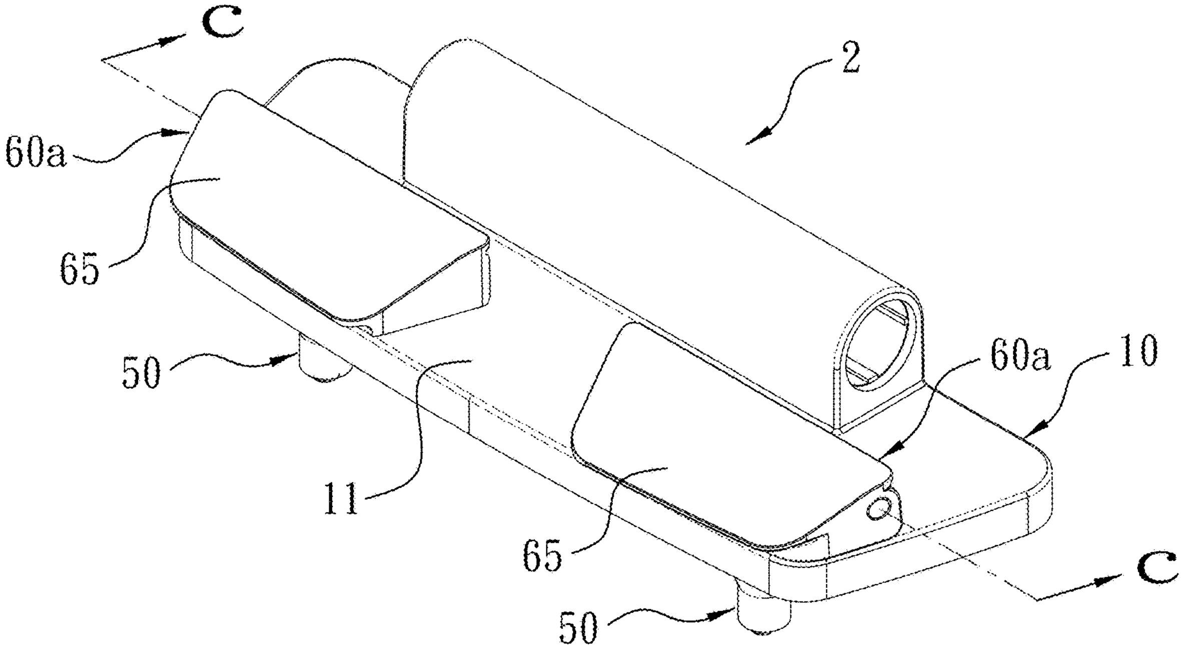
FIG. 12 is a perspective view of another embodiment showing a stopping plate at a tight position according to the present invention.
Figure 13:
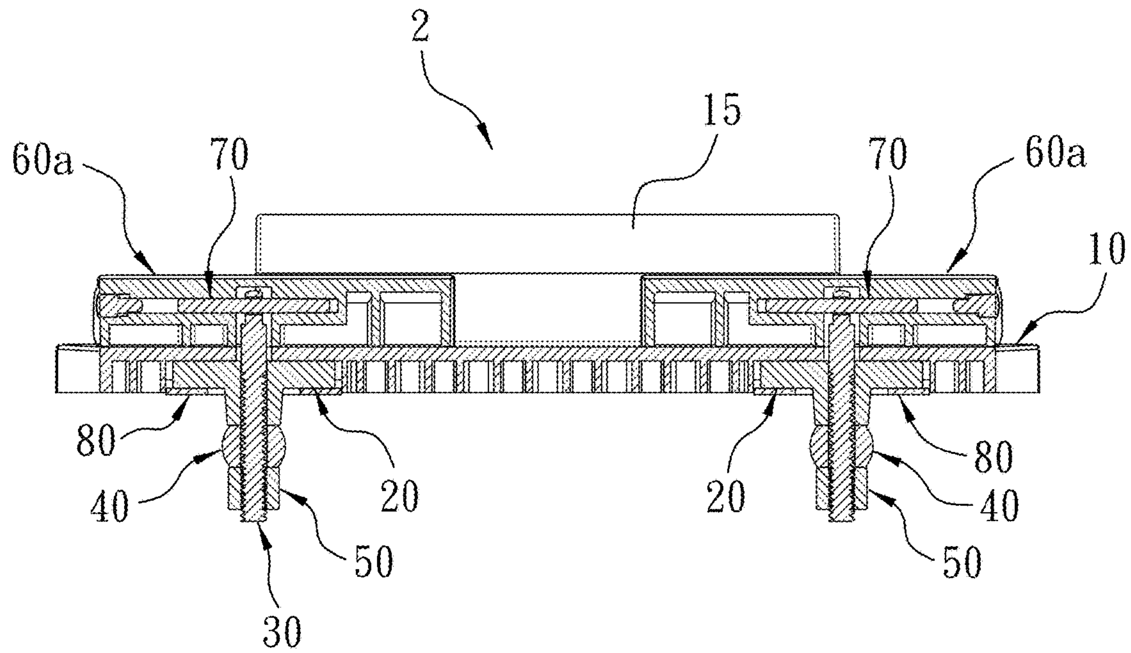
FIG. 13 is a side sectional view along a line C-C of the embodiment in FIG. 12 according to the present invention.

As shown in FIG. 12 and FIG. 13, another embodiment is provided. A fastener 2 of this embodiment is about the same as the fastener 1 of the above embodiment.

The difference between the fastener 2 and the fastener 1 is in that: the fastener 2 of this embodiment is provided with two stopping plates 60*a* which can be imagined to be formed by cutting of a middle portion of the stopping plate 60 of the above embodiment. Each of the stopping plates 60*a* is provided with one of the pivot slots 61 and one of the lateral insertion holes 611 respectively used for mounting one of the rotary shafts 70 and one of the sealing plugs 711.

It is easily understood that the upper holding board 20, the stopping lever 30, the elastic expansion part 40, and the thread engaging member 50 of the above embodiment are combined to form a fastening member which is disposed on both the left side and the right side of the base 10 for ensuring fastening security and stability. In this embodiment, each of the stopping plates 60*a* can be installed independently or combined with the fastening member.

The design of the single stopping plate 60 in the first embodiment is good at that the two fastening members are moved synchronously for loosening or fastening by one operation. Yet the two fastening members in this embodiment need to be operated independently. However, the independent design also has other advantages. For example, the stopping plates 60*a* can be replaced separately.

Figure 9:
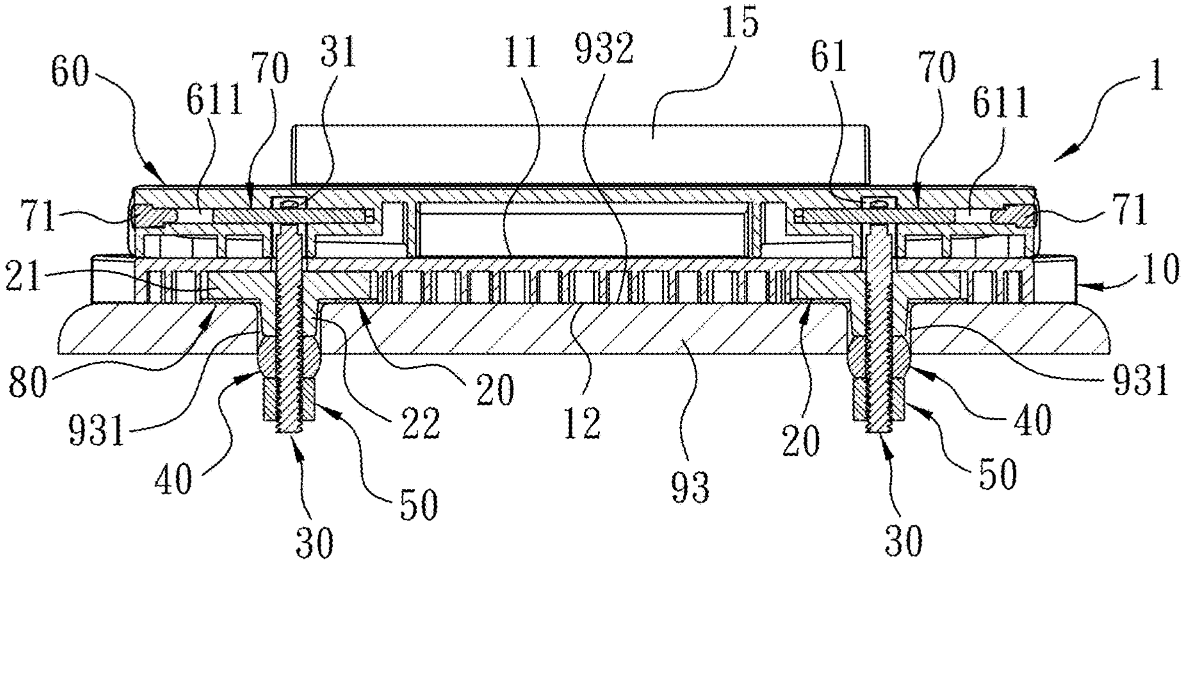
FIG. 9 is a schematic drawing showing the fastener of the embodiment in FIG. 2 installed on an installation wall of a toilet base and in a fastened state according to the present invention.
Figure 11:
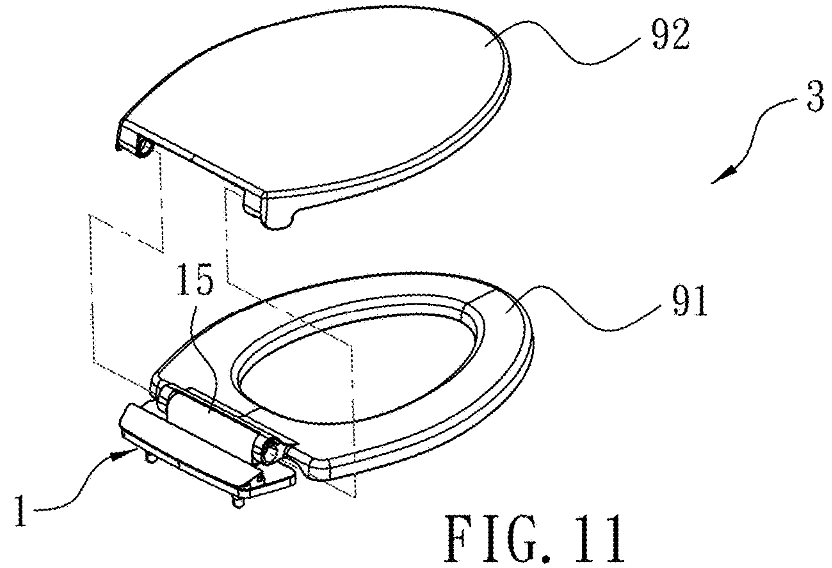
FIG. 11 is a partial exploded view of a toilet seat composed of a fastener mounted with an open seat and a separated lid of an embodiment according to the present invention.

Aa shown in FIG. 9 and FIG. 11, a toilet seat 3 is provided. The toilet seat 3 is installed on a toilet base and is composed of the fastener 1 of the first embodiment or the fasteners 2 in the second embodiment, an open seat 91, and a lid 92. An installation wall 93 is disposed on a top of a rear part of the toilet base and provided with two installation holes 931. The lower surface 12 of the base 10 of the fastener 1, 2 are able to be attached to and pressing against an upper surface 932 of the installation wall 93 of the toilet base. The clamping projection 22 of the upper holding board 20 can be moved downward to be mounted and positioned in the corresponding installation hole 931. When the stopping plate 60, 60*a* is at the tight position, at least a part of the elastic expansion parts 40 is moved upward to be mounted and clamped in the corresponding installation hole 931 for creating clamping and fastening effect. When the stopping plate 60, 60*a* is at the loose position, the elastic expansion part 40 is able to be moved downward or released from the corresponding installation hole 931. Thus at least a part of the elastic expansion part 40 is returned to its original state elastically for allowing the elastic expansion part 40 to move upward and insert through the corresponding installation hole 931. A pivot joint seat 15 is projecting from and disposed on the upper surface 11 of the base 10 and located adjacent to the stopping plate 60, 60*a* for pivot connection and positioning of the open seat 91 and the lid 92.

Generally speaking, no matter the one-piece toilet or other types of toilets, the toilet base is provided with the installation wall 93 and the installation hole 931 on the installation wall 93, as shown in FIG. 9. The toilet base is a prior art and thus not described in detail herein. It should be noted that in the fastener 1, 2, users can rotate and operate the stopping plates 60, 60*a* to position the stopping plates 60, 60*a* at the loose position in advance. Thus the thread engaging members 50, the elastic expansion parts 40, and a part of the stopping levers 30 of the two fastening members can be inserted through the installation holes 931 of the installation wall 93 of the toilet base smoothly and the clamping projection 22 of the upper holding board 20 is guided to be mounted and positioned in the corresponding installation hole 931. Under such state, after the anti-slip washer 80 on the lower surface 12 of the base 10 is roughly attached to the upper surface 932 of the installation wall 93, users can press the single stopping plate 60 of the first embodiment or the two stopping plates 60*a* of the second embodiment downward to rotate and position the stopping plates 60, 60*a* at the tight position. Then the thread engaging members 50 is moved upward axially to clamp and abut against the elastic expansion part 40 toward the clamping projection 22 of the upper holding board 20. Owing to axial clamping and squeezing, the elastic expansion part 40 is elastically expanded and raised to press on and position at a bottom of the installation hole 931. Thereby a clamping and fastening effect is provided and the toilet seat 3 is installed and fastened on the toilet base quickly. Similarly, the users can pull and rotate the pull portion 671 of the stopping plate 60, 60*a* again for positioning the stopping plate 60, 60*a* at the loose position. Then the thread engaging members 50 is moved downward axially to release clamping force on the elastic expansion part 40 and at least a part of the elastic expansion part 40 is allowed to return to its original state elastically. Thus the elastic expansion part 40 is moved downward axially or released from the bottom of the installation hole 931. Thereby the thread engaging member 50 and the elastic expansion part 40 are allowed to move upward and come out of the corresponding installation hole 931. Therefore, the toilet seat 3 is detached and removed from the toilet base quickly.

In summary, the fastener 1, 2 and the toilet seat 3 have the following features and advantages.

By the design of the single stopping plate 60 in the first fastener 1 of the first embodiment, loosening or fastening of the two fastening members at the left side and the right side can be completed by one operation at the same time. Thus the assembly or disassembly process can be simplified and detachment efficiency is increased.

Moreover, with fewer components, the present fastener 1, 2 can be assembled easily and fast. Incorrect assembly by staff can also be avoided.

Furthermore, compared with conventional threaded engagement structure, the design of the positioning plate 21 of the upper holding boards 20 horizontally mounted and positioned in the positioning slot 13 of the base 10 not only provides easier and faster assembly but also ensures the upper holding boards 20 on the fastening members at the left side and the right side both at the same level, especially the clamping projection 22 of the upper holding board 20 which affects consistency of the following elastic expansion or compression of the respective elastic expansion parts 40.

In addition, the present invention not only provides the horizontal movement gap S1 designed between the positioning plate 21 of the upper holding board 20 and the positioning slot 13 of the base 1 for allowing automatic fine adjustment of the positioning plate 21 in the positioning slot 13 but also provides the sliding gap S2 formed between the first end 31 of the stopping lever 30 and the pivot slot 61 of the stopping plate 60, 60*a* for allowing fine adjustment and sliding of the first end 31 of the stopping lever 30 on the corresponding rotary shaft 70. When there is a larger difference in the distance between the installation holes 931 on the left side and the right side of the toilet base, the whole stopping lever 30 together with the components thereof can keep at the vertical state by the horizontal movement gap S1 in combination with the sliding gap S2. Thus it is ensured that the respective fastening members can provide fastening effect in optimal condition. Therefore, the installation is more stable and the fastening is more durable. Bending deformation of the stopping lever 30 caused by tilting can also be avoided. The service life and functions of the component are ensured.

Additionally, the stopping plate 60, 60*a* is provided with the press surface 65 conductive to drainage and the pull portion 671 extending smoothly from the press surface 65 to avoid water accumulated on the surface of the stopping plate 60, 60*a*. Thereby clean and sanitary use of the stopping plate 60, 60*a* is ensured, especially when users need to operate the stopping plate 60, 60*a* later.

The clamping projection 22 of the upper holding board 20 is tapered from the junction between the clamping projection 22 and the positioning plate 21 toward the end of the clamping projection 22 to form a conical cylinder. Such design allows the clamping projection 22 able to be mounted to the installation holes 931 easily and quickly. Under installation and fastened condition, the design also ensures that there is no large gap generated between the clamping projection 22 and the installation holes 931 and the clamping projection 22 is even locked and positioned in an inner wall of the installation holes 931 no matter the diameter of the installation holes 931 is getting larger or smaller due to shrinkage of ceramic materials after molding. Thereby the installed toilet seat 3 will not have obvious lateral movement or shaking while in use and a sense of discomfort derived can be avoided effectively.

An anti-slip washer 80 is arranged around the respective positioning slots 13 on the lower surface 12 of the base 10. The anti-slip washer 80 is not only made from anti-slip material such as rubber material able to have larger friction force with respect to ceramic materials but also distributed around the respective fastening members evenly for providing more even and larger contact area on the right and the left sides. After completing installation of the above the above fastener 1, 2, the anti-slip washer 80 is pressed tightly on the right and the left sides of the upper surface 932 of the installation wall 93 of the toilet base evenly and firmly and further providing good anti-slip and fastening effect. Thereby slip resistance between the toilet seat 3 and the upper surface 932 of the toilet base is further improved and strengthened. The deviation or sliding generated in use and discomfort derived can also be avoided effectively.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

The invention claimed is:

1. A fastener comprising:

a base having an upper surface, a lower surface, and a positioning slot arranged concavely on each of two sides of the lower surface; a through hole disposed on a bottom of the positioning slot;

two upper holding boards each of which includes a positioning plate horizontally mounted and positioned in the positioning slot, a clamping projection projecting from a lower surface of the positioning plate, and an insertion hole penetrating the positioning plate and the clamping projection;

two stopping levers each of which is inserted through the through hole of the base and the insertion hole of the upper holding board correspondingly and having a first end, a second end, and a threaded portion located at the second end;

two elastic expansion parts each of which is mounted to the stopping lever and squeezed axially to have elastic expansion;

two thread engaging members each of which is threaded to the threaded portion of the stopping lever, whereby the elastic expansion part is clamped and abutted against the clamping projection of the upper holding board; and a stopping plate operated and rotated between a loose position and a tight position and having two pivot slots corresponding to the positioning slots, a first pressing portion, and a second pressing portion; the first end of the stopping lever pivotally connected to the pivot slot; wherein when the stopping plate is rotated and positioned at the loose position, the first pressing portion is abutting against the upper surface of the base and the stopping lever is moved to drive the thread engaging member to move downward axially, thereby the elastic expansion part is released; wherein when the stopping plate is rotated and positioned at the tight position, the second pressing portion is abutting against the upper surface of the base and the stopping lever is moved to drive the thread engaging member to move upward axially, thereby the elastic expansion part is squeezed and expanded.

2. The fastener as claimed in claim 1, wherein the fastener further includes two rotary shafts; a lateral insertion hole communicating with the pivot slot is arranged at each of two sides of the stopping plate; the rotary shaft is inserted through the lateral insertion hole for pivotally connecting the first end of the stopping lever to the pivot slot.

3. The fastener as claimed in claim 2, wherein the fastener further includes two sealing plugs each of which is configured to seal the lateral insertion hole.

4. The fastener as claimed in claim 2, wherein a first radial distance is formed between the first pressing portion and an axis of the corresponding rotary shaft of the fastener; a second radial distance is formed between the second pressing portion and the axis of the corresponding rotary shaft of the fastener; the second radial distance is larger than the first radial distance.

5. The fastener as claimed in claim 1, wherein a press surface is disposed on one side of the stopping plate opposite to a side of the stopping plate with the second pressing portion for being pressed and operated to rotate the stopping plate from the loose position to the tight position.

6. The fastener as claimed in claim 5, wherein the stopping plate includes a first side and a second side opposite to each other; the pivot slot is corresponding to the first side; a lip-shaped pull portion is projecting and extending from the second side for allowing users to pull and apply force to the pull portion and further rotate the stopping plate from the tight position to the loose position.

7. The fastener as claimed in claim 6, wherein an upper surface of the pull portion is smoothly extending from the press surface.

8. The fastener as claimed in claim 7, wherein the press surface and the upper surface of the pull portion are tilted and combined to form a draining surface when the stopping plate is at the tight position.

9. The fastener as claimed in claim 1, wherein the clamping projection of the upper holding board is tapered from a junction between the clamping projection and the positioning plate toward an end of the clamping projection to form a conical cylinder.

10. The fastener as claimed in claim 1, wherein the fastener further includes two anti-slip washers; two installation slots are disposed on the lower surface of the base and located around the positioning slots for mounting and positioning the anti-slip washers correspondingly; an anti-slipping surface is disposed on a bottom of the anti-slip washer and a little bit projecting from the lower surface of the base; the anti-slip washer further includes an opening for allowing the clamping projection of the upper holding board to insert through.

11. The fastener as claimed in claim 1, wherein an omnidirectional horizontal movement gap is formed between the positioning plate of the upper holding board and the positioning slot of the base.

12. The fastener as claimed in claim 2, wherein a sliding gap is formed between the stopping lever and the pivot slot of the stopping plate for allowing fine adjustment and sliding of the stopping lever on the rotary shaft.

13. A fastener comprising:

a base having an upper surface, a lower surface, and a positioning slot arranged concavely on each of two sides of the lower surface; a through hole disposed on a bottom of the positioning slot;

two upper holding boards each of which includes a positioning plate horizontally mounted and positioned in the positioning slot, a clamping projection extending and projecting from a lower surface of the positioning plate, and an insertion hole penetrating the positioning plate and the clamping projection;

two stopping levers each of which is inserted through the through hole of the base and the insertion hole of the upper holding board correspondingly and having a first end, a second end, and a threaded portion located at the second end;

two elastic expansion parts each of which is mounted to the stopping lever and squeezed axially to have elastic expansion; and two thread engaging members each of which is threaded to the threaded portion of the stopping lever, whereby the elastic expansion part is clamped and abutted against the clamping projection of the upper holding board; and two stopping plates each of which is operated and rotated between a loose position and a tight position and having a pivot slot corresponding to the positioning slot, a first pressing portion, and a second pressing portion; the first end of the stopping lever pivotally connected to the corresponding pivot slot; wherein when one of the stopping plates is rotated and positioned at the loose position, the first pressing portion on the stopping plate is abutting against the upper surface of the base and the corresponding stopping lever is moved to drive the corresponding thread engaging member to move downward axially, thereby the corresponding elastic expansion part is released; wherein when one of the stopping plates is rotated and positioned at the tight position, the second pressing portion on the stopping plate is abutting against the upper surface of the base and the corresponding stopping lever is moved to drive the corresponding thread engaging member to move upward axially, thereby the corresponding elastic expansion part is squeezed and expanded.

14. The fastener as claimed in claim 13, wherein the fastener further includes two rotary shafts; a lateral insertion hole communicating with the pivot slot is mounted to at least one side of the stopping plate; the rotary shaft is inserted through the lateral insertion hole for pivotally connecting the first end of the stopping lever to the pivot slot.

15. The fastener as claimed in claim 14, wherein the fastener further includes two sealing plugs each of which is configured to seal the lateral insertion hole.

16. The fastener as claimed in claim 14, wherein a first radial distance is formed between the first pressing portion and an axis of the corresponding rotary shaft of the fastener; a second radial distance is formed between the second pressing portion and the axis of the corresponding rotary shaft of the fastener; the second radial distance is larger than the first radial distance.

17. The fastener as claimed in claim 13, wherein a press surface is disposed on one side of the stopping plate opposite to a side of the stopping plate with the second pressing portion for being pressed and operated to rotate the stopping plate from the loose position to the tight position.

18. The fastener as claimed in claim 17, wherein each of the stopping plates includes a first side and a second side opposite to each other; the pivot slot is corresponding to the first side; a lip-shaped pull portion is projecting and extending from the second side for allowing users to pull and apply force to the pull portion and further rotate the stopping plate from the tight position to the loose position.

19. The fastener as claimed in claim 18, wherein an upper surface of the pull portion is smoothly extending from the press surface.

20. The fastener as claimed in claim 19, wherein the press surface and the upper surface of the pull portion are tilted and combined to form a draining surface when the stopping plate is at the tight position.

21. The fastener as claimed in claim 13, wherein the clamping projection of the upper holding board is tapered from a junction between the clamping projection and the positioning plate toward an end of the clamping projection to form a conical cylinder.

22. The fastener as claimed in claim 13, wherein the fastener further includes two anti-slip washers; two installation slots are disposed on the lower surface of the base and located around the positioning slots for mounting and positioning the anti-slip washers correspondingly; an anti-slipping surface is disposed on a bottom of the anti-slip washer and a little bit projecting from the lower surface of the base; the anti-slip washer further includes an opening for allowing the clamping projection of the upper holding board to insert through.

23. The fastener as claimed in claim 13, wherein an omnidirectional horizontal movement gap is formed between the positioning plate of the upper holding board and the positioning slot of the base.

24. The fastener as claimed in claim 14, wherein a sliding gap is formed between the stopping lever and the pivot slot of the stopping plate for allowing fine adjustment and sliding of the stopping lever on the rotary shaft.

25. A toilet seat installed on a toilet base comprising a fastener as claimed in claim 1, an open seat, and a lid; an installation wall disposed on a top of a rear part of the toilet base and having two installation holes; wherein the lower surface of the base of the fastener is attached to and pressing against an upper surface of the installation wall behind the toilet base; the clamping projection of the upper holding board is moved downward to be mounted and positioned in the corresponding installation hole; wherein when the stopping plate is at the tight position, at least a part of the elastic expansion parts is moved upward to be mounted and clamped in the corresponding installation hole for creating clamping and fastening effect; wherein when the stopping plate is at the loose position, the elastic expansion part is moved downward or released from the corresponding installation hole, whereby at least a part of the elastic expansion part is returned to original state elastically for allowing the elastic expansion part to move upward and insert through the corresponding installation hole; wherein a pivot joint seat is projecting from the upper surface of the base and located adjacent to the stopping plate for pivot connection and positioning of the open seat and the lid.

26. A toilet seat installed on a toilet base comprising a fastener as claimed in claim 13, an open seat, and a lid; an installation wall disposed on a top of a rear part of the toilet base and having two installation holes; wherein the lower surface of the base of the fastener is attached to and pressing against an upper surface of the installation wall behind the toilet base; the clamping projection of the upper holding board is moved downward to be mounted and positioned in the corresponding installation hole; wherein when the stopping plate is at the tight position, at least a part of the elastic expansion parts is moved upward to be mounted and clamped in the corresponding installation hole for creating clamping and fastening effect; wherein when the stopping plate is at the loose position, the elastic expansion part is moved downward or released from the corresponding installation hole, whereby at least a part of the elastic expansion part is returned to original state elastically for allowing the elastic expansion part to move upward and insert through the corresponding installation hole; wherein a pivot joint seat is projecting from the upper surface of the base and located adjacent to the stopping plate for pivot connection and positioning of the open seat and the lid.

* * * * *